US012420244B2

(12) United States Patent
Kornacki et al.

(10) Patent No.: US 12,420,244 B2
(45) Date of Patent: Sep. 23, 2025

(54) ASSEMBLY FOR SELECTIVELY AERATING A BEVERAGE

(71) Applicant: Üllo LLC, Chicago, IL (US)

(72) Inventors: James Richard Kornacki, Chicago, IL (US); Asher Finkell, Chicago, IL (US); Bart Ruijpers, Chicago, IL (US)

(73) Assignee: Üllo LLC, Chicago, IL (US)

( * ) Notice: Subject to any disclaimer, the term of this patent is extended or adjusted under 35 U.S.C. 154(b) by 899 days.

(21) Appl. No.: 17/571,362

(22) Filed: Jan. 7, 2022

(65) Prior Publication Data

US 2022/0212151 A1 Jul. 7, 2022

Related U.S. Application Data

(60) Provisional application No. 63/134,851, filed on Jan. 7, 2021.

(51) Int. Cl.

| | |
|---|---|
| ***B01F 23/236*** | (2022.01) |
| ***B01F 23/23*** | (2022.01) |
| ***B01F 23/232*** | (2022.01) |
| ***B01F 101/17*** | (2022.01) |

(52) U.S. Cl.

CPC ........ *B01F 23/2363* (2022.01); *B01F 23/232* (2022.01); *B01F 23/2366* (2022.01); *B01F 2101/17* (2022.01)

(58) Field of Classification Search

CPC ................ B01F 23/2363; B01F 23/232; B01F 23/23412; B01F 23/2366; B01F 2101/17

See application file for complete search history.

(56) References Cited

U.S. PATENT DOCUMENTS

| | | | |
|---|---|---|---|
| 6,450,214 | B1 | 9/2002 | Dyer et al. |
| 7,841,584 | B2 | 11/2010 | Sabadicci et al. |
| 8,196,906 | B2 | 6/2012 | Benton et al. |
| 8,272,538 | B2 | 9/2012 | Weinberg et al. |
| 8,430,023 | B2 | 4/2013 | Hynes |

(Continued)

FOREIGN PATENT DOCUMENTS

| | | | |
|---|---|---|---|
| EP | 2732868 | A2 | 5/2014 |
| WO | WO-2007/096676 | A1 | 8/2007 |

(Continued)

*Primary Examiner* — Thien S Tran

(74) *Attorney, Agent, or Firm* — MARSHALL, GERSTEIN & BORUN LLP

(57) ABSTRACT

An assembly for selectively aerating a beverage. The assembly includes a body, a diverter movable between first, second, and third positions, and an aerator in fluid communication with the diverter, the aerator including a central outlet and aeration outlets. When the diverter is in the first position, the diverter is positioned such that the beverage flows through the body and the central outlet while bypassing the aeration outlets. When the diverter is in the second position, the diverter is positioned such that the beverage flows through the aeration outlets while bypassing the central outlet. When the diverter is in the third position, the diverter is positioned such that the beverage flows through the body, a first portion of the beverage flows through the central outlet while bypassing the aeration outlets, and a second portion of the beverage flows through the aeration outlets while bypassing the central outlet.

24 Claims, 17 Drawing Sheets

(56) References Cited

U.S. PATENT DOCUMENTS

| | | | | |
|---|---|---|---|---|
| 8,590,865 | B2 | 11/2013 | Heyman et al. | |
| 8,727,324 | B2 | 5/2014 | Borden et al. | |
| 9,719,061 | B2 | 8/2017 | Buzzard et al. | |
| 10,220,357 | B1 * | 3/2019 | Hsueh | B01F 27/911 |
| 10,500,552 | B1 * | 12/2019 | Liu | B01F 23/2361 |
| 11,219,871 | B2 * | 1/2022 | Simone | B01F 33/5014 |
| 2010/0025867 | A1 | 2/2010 | Benton et al. | |
| 2011/0024461 | A1 | 2/2011 | Kilduff et al. | |
| 2011/0024925 | A1 | 2/2011 | Mauffette | |
| 2011/0271846 | A1 | 11/2011 | Hynes | |
| 2012/0111893 | A1 | 5/2012 | Luebke | |
| 2012/0156338 | A1 | 6/2012 | Agarwal et al. | |
| 2012/0156345 | A1 | 6/2012 | Agarwal et al. | |
| 2013/0140721 | A1 | 6/2013 | Borden et al. | |
| 2013/0207284 | A1 * | 8/2013 | Heyman | B01F 33/5012 261/118 |
| 2013/0280374 | A1 | 10/2013 | Catelli et al. | |
| 2014/0120226 | A1 | 5/2014 | Kuru et al. | |
| 2015/0093485 | A1 | 4/2015 | Kornacki | |
| 2016/0214070 | A1 * | 7/2016 | Stevenson | B01F 33/5011 |
| 2019/0373828 | A1 * | 12/2019 | Elkington | A01G 31/00 |

FOREIGN PATENT DOCUMENTS

| | | | |
|---|---|---|---|
| WO | WO-2009/122234 | A2 | 10/2009 |
| WO | WO-2013/022696 | A2 | 2/2013 |

* cited by examiner

ASSEMBLY FOR SELECTIVELY AERATING A BEVERAGE

FIELD OF THE DISCLOSURE

This disclosure relates generally to an assembly for selectively aerating and enhancing (e.g., filtering or purifying) a beverage such as wine.

BACKGROUND

Oenophiles generally agree that different wines require different preparative approaches to attain the peak possible experience. Some wines can be enhanced using entrained air through an aerator, such as those disclosed in U.S. Pat. Pub. No. US 2012/0156338 A1 and U.S. Pat. Nos. 7,841,584 B2 and 9,719,061 B2, which are hereby incorporated by reference. Aerators are used to soften tannins and improve taste but are not capable of eliminating undesirable wine additives, such as preservative sulfites. However, not all wines are enhanced by aerating the wine because, for example, too much exposure to oxygen can adversely alter the flavor of the wine.

SUMMARY OF THE DISCLOSURE

In accordance with a first aspect of the disclosure, an assembly for selectively aerating a beverage is disclosed. The assembly includes a body, a diverter movable between first, second, and third positions, and an aerator in fluid communication with the diverter, the aerator including a central outlet and aeration outlets. When the diverter is in the first position, the diverter is positioned such that the beverage flows through the body and the central outlet while bypassing the aeration outlets. When the diverter is in the second position, the diverter is positioned such that the beverage flows through the aeration outlets while bypassing the central outlet. When the diverter is in the third position, the diverter is positioned such that the beverage flows through the body, a first portion of the beverage flows through the central outlet while bypassing the aeration outlets, and a second portion of the beverage flows through the aeration outlets while bypassing the central outlet.

DETAILED DESCRIPTION

Figure 1:
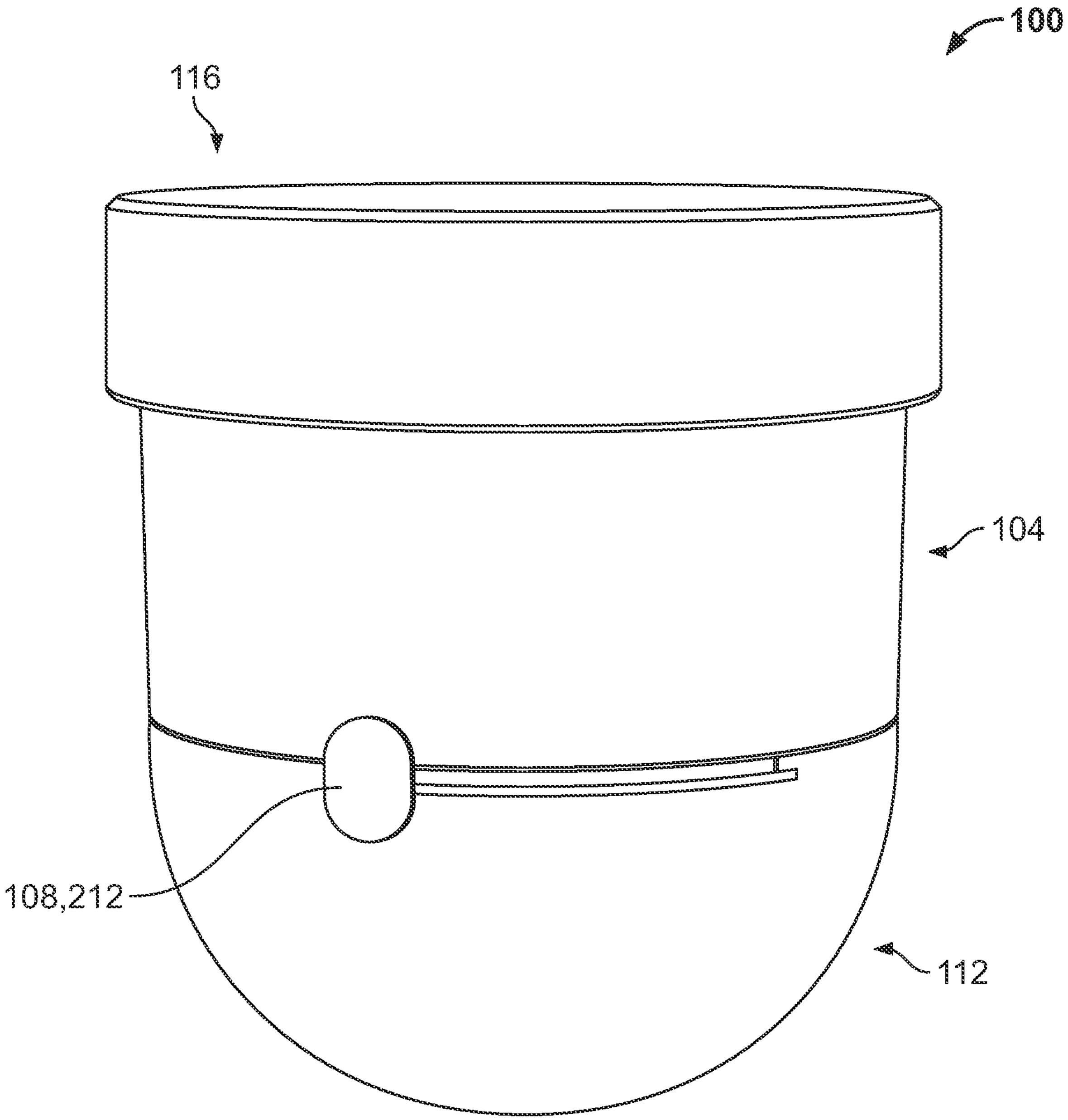
FIG. 1 is a plan view of an example of an assembly for selectively aerating a beverage, constructed in accordance with the teachings of the present disclosure.
Figure 2:
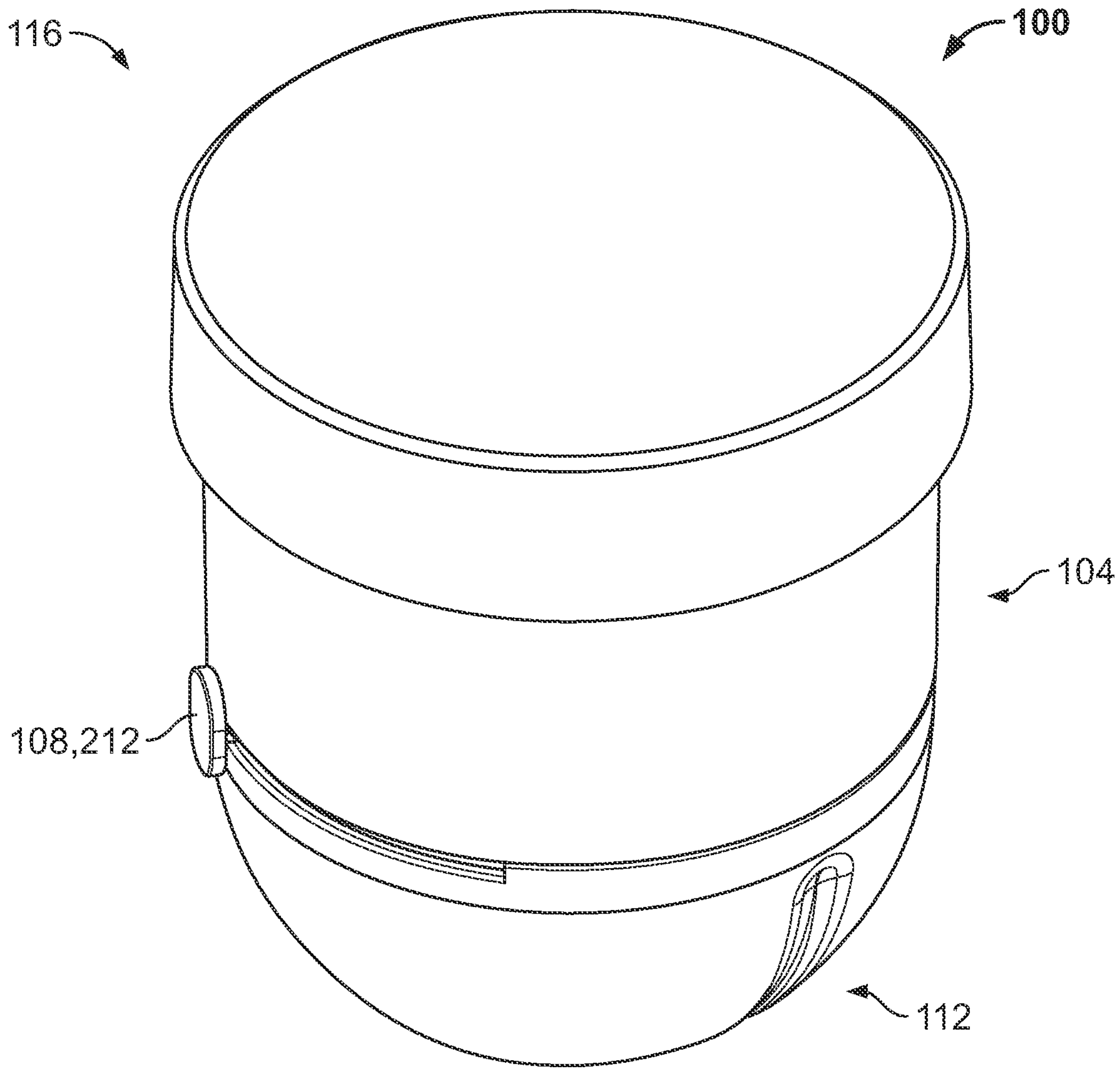
FIG. 2 is a front perspective view of FIG. 1.
Figure 3:
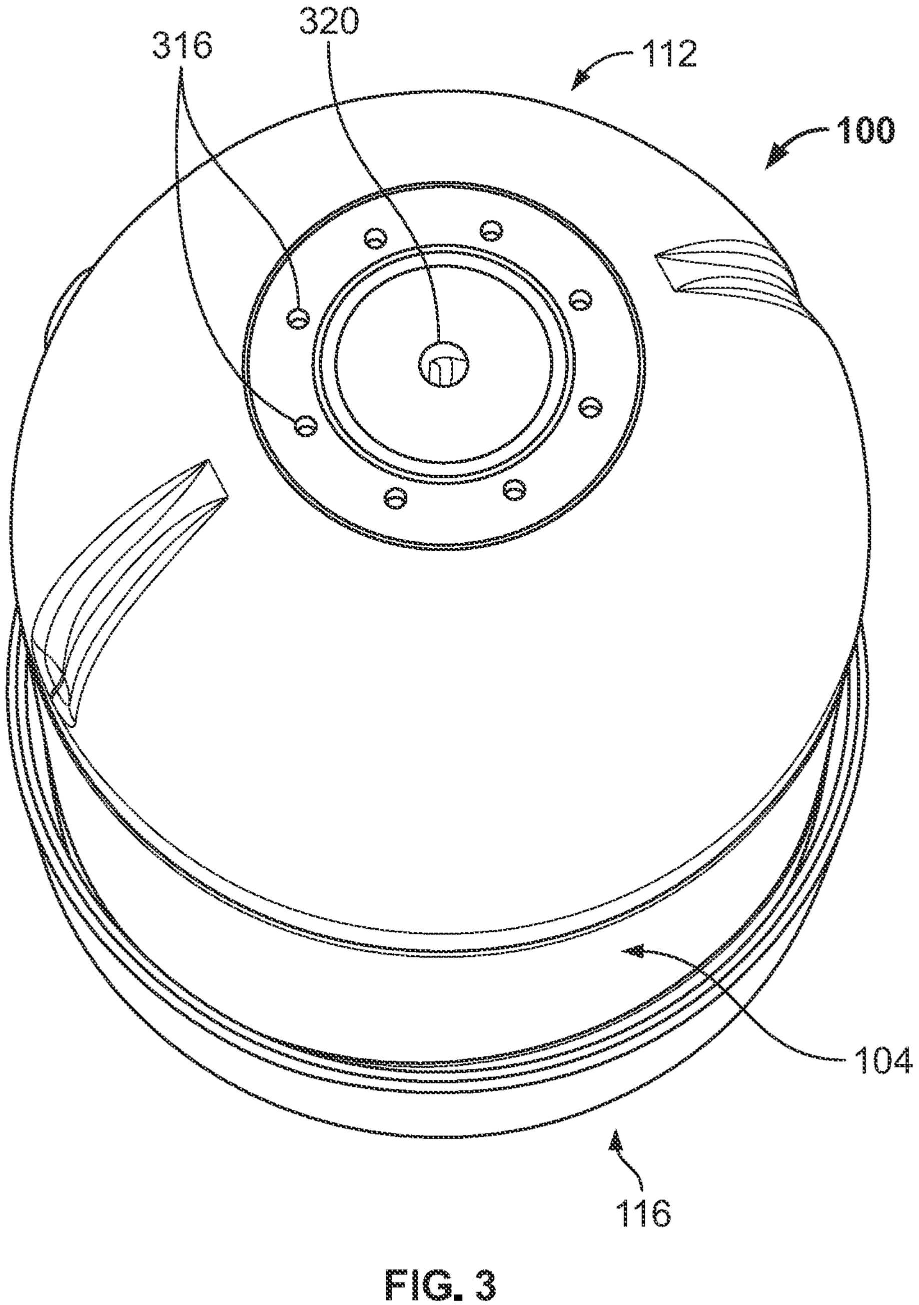
FIG. 3 is a bottom perspective view of FIG. 1.

The present disclosure is directed to an assembly for selectively aerating a beverage such as wine. More particularly, the disclosed assembly provides an aeration gradient that allows a user to fully aerate the beverage (when, for example, the beverage would be enhanced by such aeration), partially aerate the beverage, or bypass aeration of the beverage altogether (when, for example, the beverage would not be enhanced by such aeration). Thus, the degree to which the assembly aerates the beverage (if it does so at all) is fully customizable by the user. The disclosed assembly also includes a filter that enhances the beverage by removing impurities (e.g., sulfites) from the beverage. The disclosed assembly can be placed and operated within a container (e.g., a carafe, a glass) or can be operated independently of such a container.

FIGS. 1-17 illustrate an example of an assembly 100 constructed in accordance with the teachings of the present disclosure. As illustrated, the assembly 100 generally includes a body portion 104 defining a reservoir 106 adapted to receive a beverage (e.g., wine), a diverter member 108, an aerator member 112, and, optionally, a cap 116 removably coupleable to the body portion 104 for selectively enclosing the body portion 104. The diverter member 108 is removably coupled to both the body portion 104 and the aerator member 112 such that the diverter member 108 is movable to control the degree of aeration provided by the aerator member 112. More particularly, the diverter member 108 is movable, relative to the body portion 104 and the aerator member 112, between a first position, a second position, and a number of third positions intermediate the first position and the second position to control the degree of aeration provided by the aerator member 112. When the diverter member 108 is in the first position, the diverter member 108 is aligned with the body portion 104 such that the aerator member 112 does not aerate any of the beverage as the beverage flows through the assembly 100. Conversely, when the diverter member 108 is in the second position, the diverter member 108 is aligned with the body portion 104 such that the aerator member 112 aerates all of the beverage as the beverage flows through the assembly 100 (i.e., the aerator member 112 fully aerates the beverage). Meanwhile, when the diverter member 108 is in one of the third positions, the diverter member 108 is aligned with the body portion 104 such that the aerator member 112 aerates only a portion of the beverage as the beverage flows through the assembly (i.e., the aerator member 112 partially aerates the beverage). The exact amount of aeration provided by the aerator member 112 when the diverter member 108 is in one of the intermediate, third positions will depend on the exact positioning of the diverter member 108 relative to the first position and the second position. Generally speaking, the closer the diverter member 108 is to the second position (i.e., the closer the third position is to the second position), the greater the degree of aeration provided by the aerator member 112.

Figure 4:
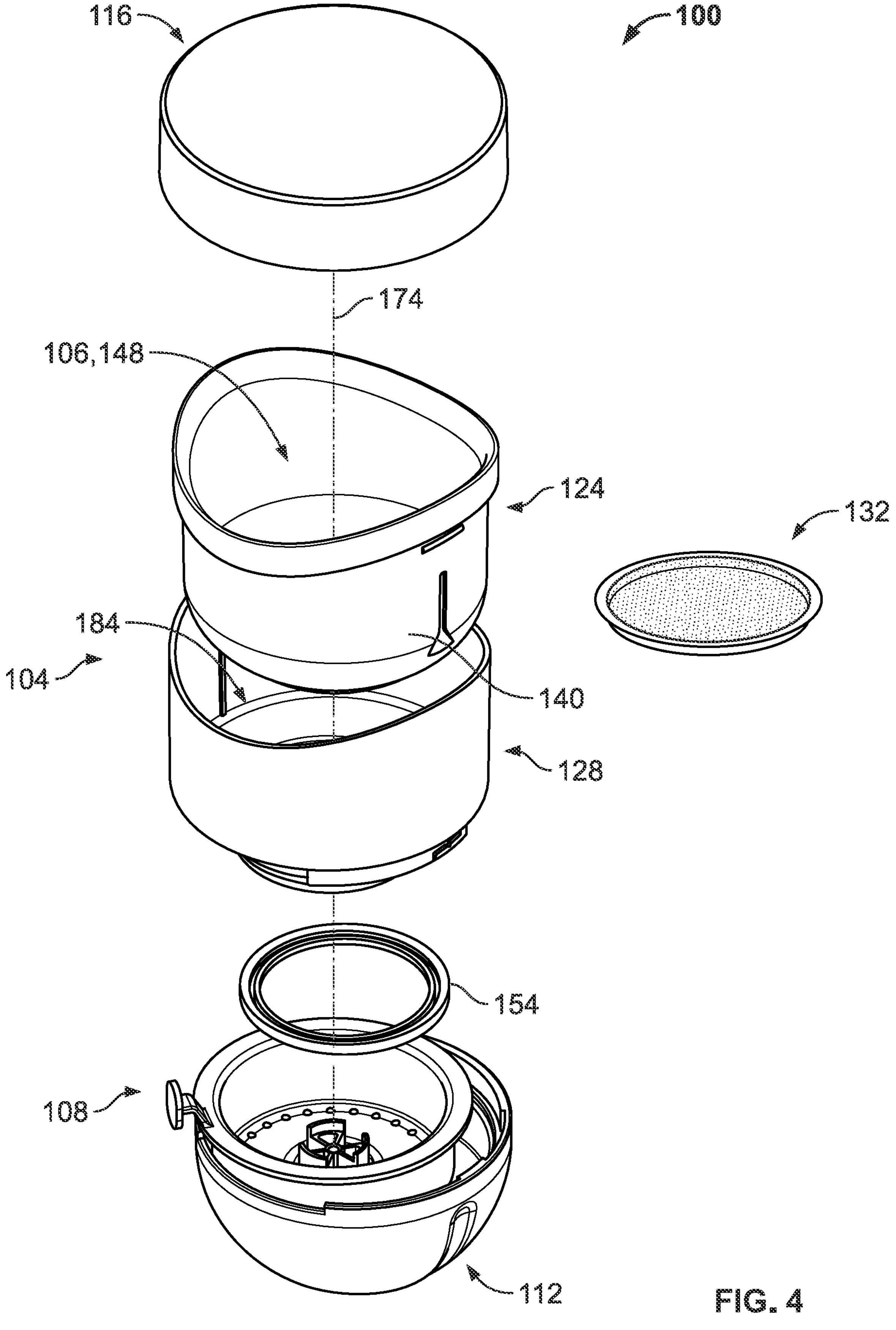
FIG. 4 is an exploded view of the assembly of FIG. 1.

Reference will now be made to FIGS. 4-10 to discuss further details about the body portion 104. As best illustrated in FIG. 4, the body portion 104 in this example generally includes a first or upper portion 124, a second or lower portion 128 removably coupled to the first portion 124, and, optionally, a filter 132 disposed between the first portion 124 and the second portion 128. Because in this example the second portion 128 is removably coupled to the first portion 124, the filter 132 can be removed and replaced with a new filter as needed. However, in other examples, the second portion 128 can be fixedly coupled to (e.g., integrally formed with) the first portion 124, in which case the filter 132 can be fixedly disposed in the body portion 104 (or can be located elsewhere).

Figure 5:
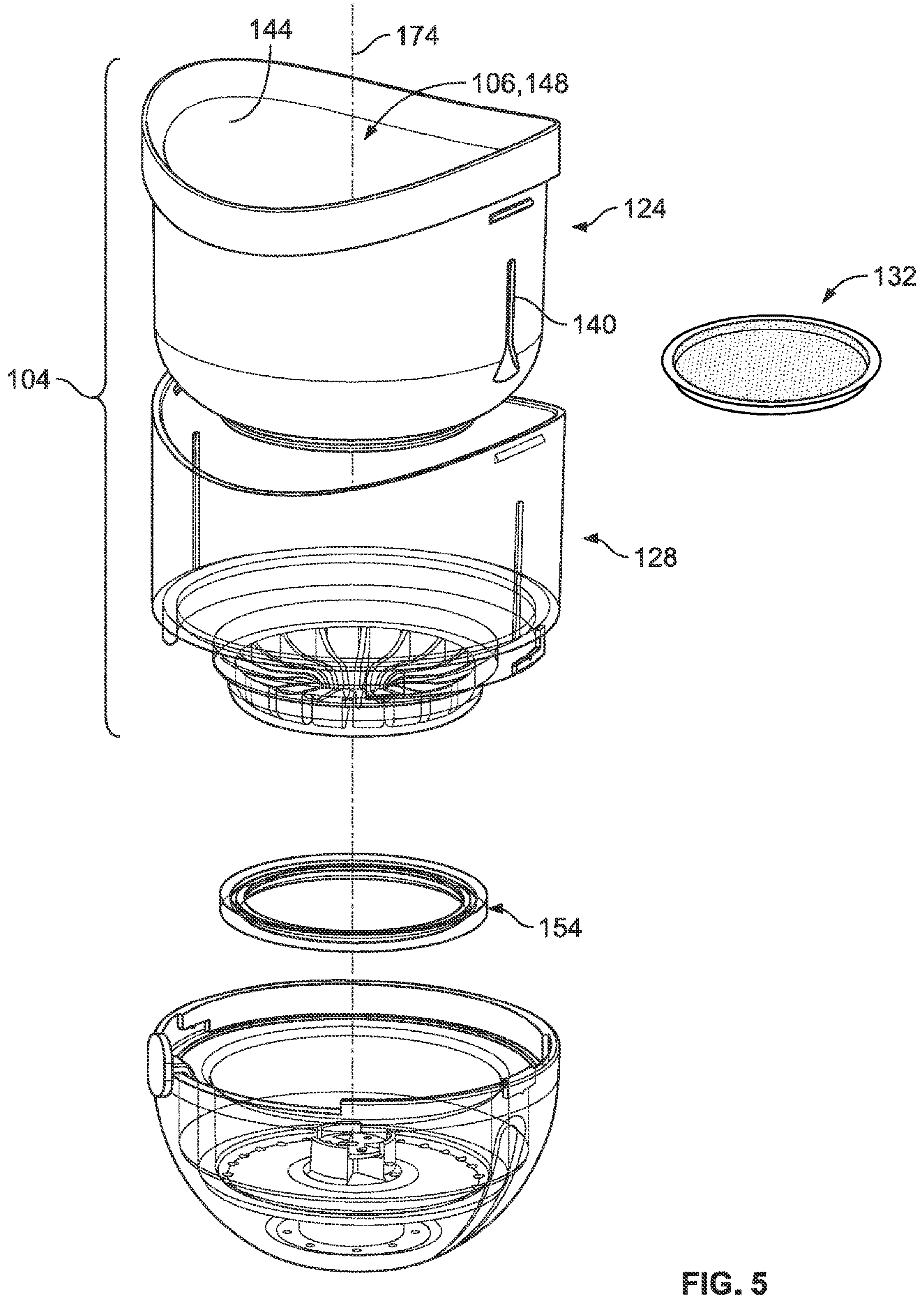
FIG. 5 is a front perspective view of a first portion of a body of the assembly of FIG. 1.
Figure 6:
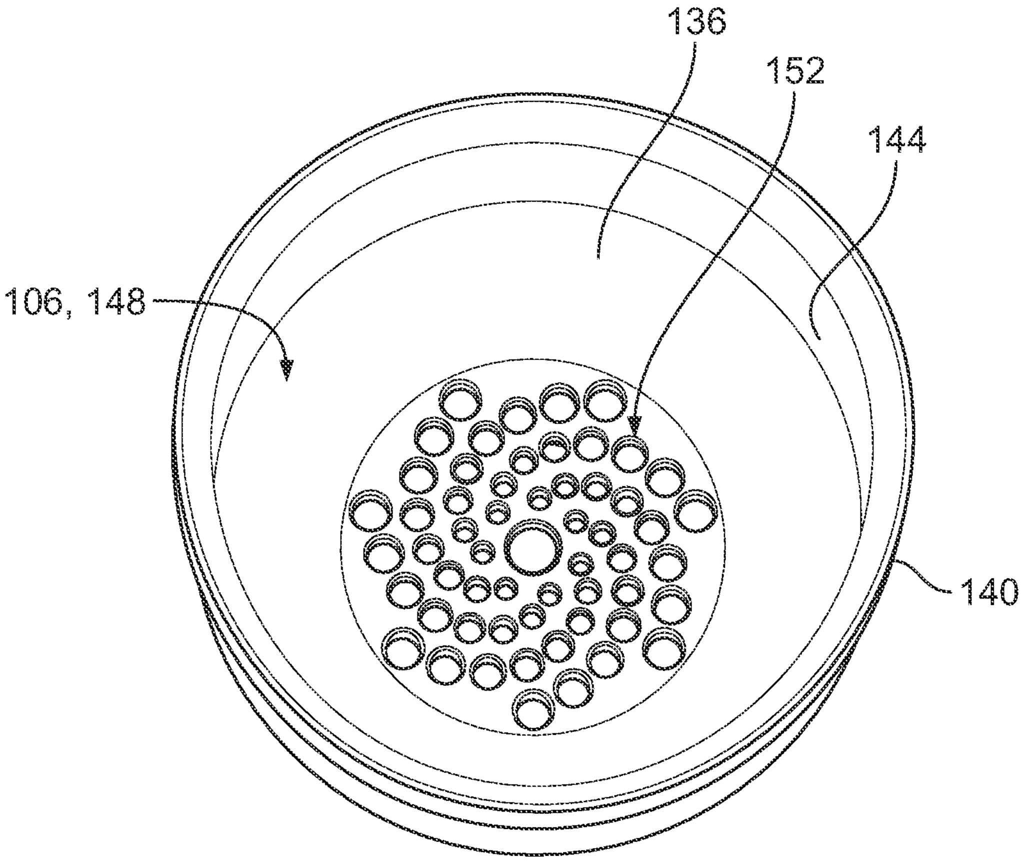
FIG. 6 is a top perspective view of FIG. 5.

As best illustrated in FIGS. 4-6, the upper portion 124 in this example has a generally cylindrical shape defined by an upper base 136, an outer wall 140, and an inner wall 144. The outer wall 140 extends outward (upward in the orientation illustrated in FIG. 4) from the base 136 such that the outer wall 140 is arranged to engage the second portion 128 when the first and second portions 124, 128 are coupled together. The inner wall 144 also extends outward (upward in the orientation illustrated in FIG. 4) from the base 136, but at a position radially inward of the outer wall 140. The inner wall 144 forms both a body inlet 148 arranged to receive the beverage and, along with the base 136, defines the reservoir 106 for receiving the beverage.

The upper portion 124 also generally includes a plurality of body apertures 152 formed through the base 136. In this example, the plurality of body apertures 152 includes apertures of different diameters arranged in a spiral pattern, as illustrated in FIG. 6. However, in other examples, the apertures can have equal diameters and/or be arranged in a different pattern (or in no pattern at all). Further, the upper portion 124 also includes a sealing element 154 (which is only visible in FIGS. 4 and 5). In this example, the sealing element 154 takes the form of a sealing ring that is coupled to and carried on an underside of the base 136, such that the sealing element 154 surrounds the plurality of body apertures 152. In other examples, however, the sealing element 154 can be located in a different position. In any event, the sealing element 154 is positioned to prevent the beverage from flowing radially outward, towards the outer wall 140, after the beverage flows through the plurality of body apertures 152.

As best illustrated in FIGS. 7-10, the lower portion 128 in this example has a generally cylindrical shape defined by a lower base 156, an outer wall 160, and an inner wall 164. The outer wall 160 extends outward (upward in the orientation illustrated in FIG. 4) from the base 156. The inner wall 164 likewise extends outward (upward in the orientation illustrated in FIG. 4) from the base 156, but at a position radially inward of the outer wall 160. The inner wall 164 is therefore arranged to engage the outer wall 140 of the upper portion 124 when the first and second portions 124, 128 are coupled together.

Figure 7:
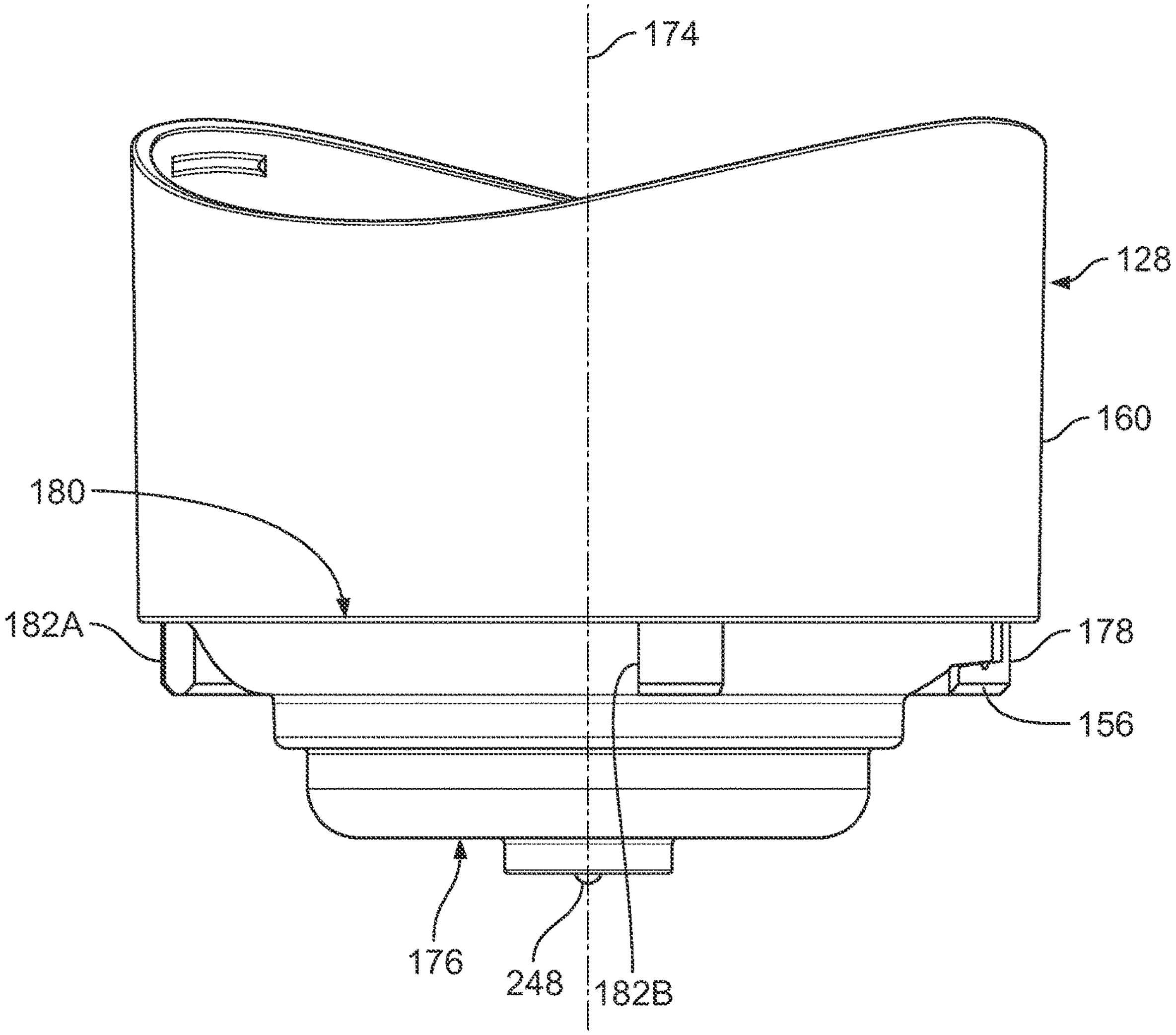
FIG. 7 is a plan view of a second portion of the body of the assembly of FIG. 1.
Figure 8:
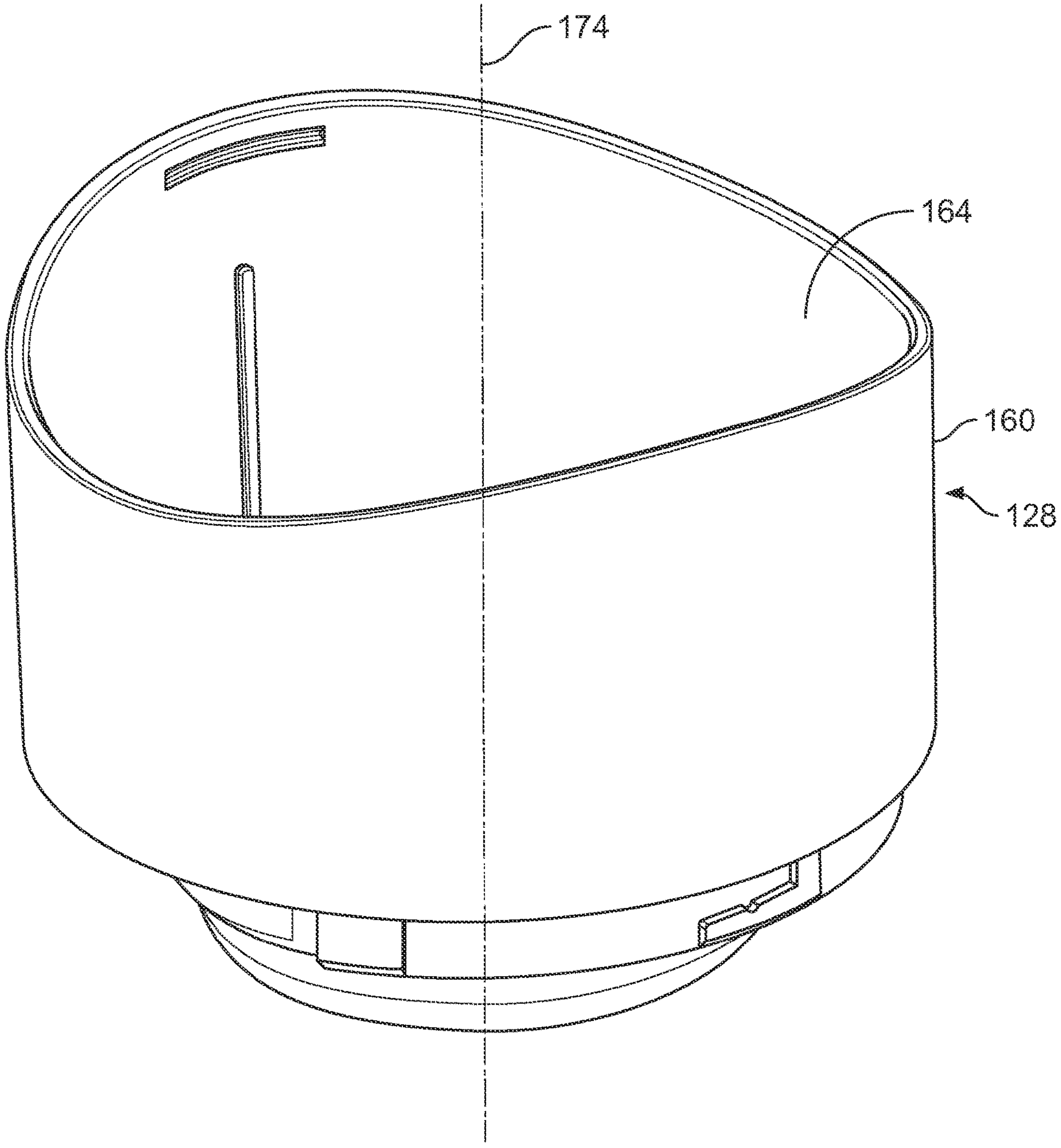
FIG. 8 is a front perspective view of FIG. 7.
Figure 9:
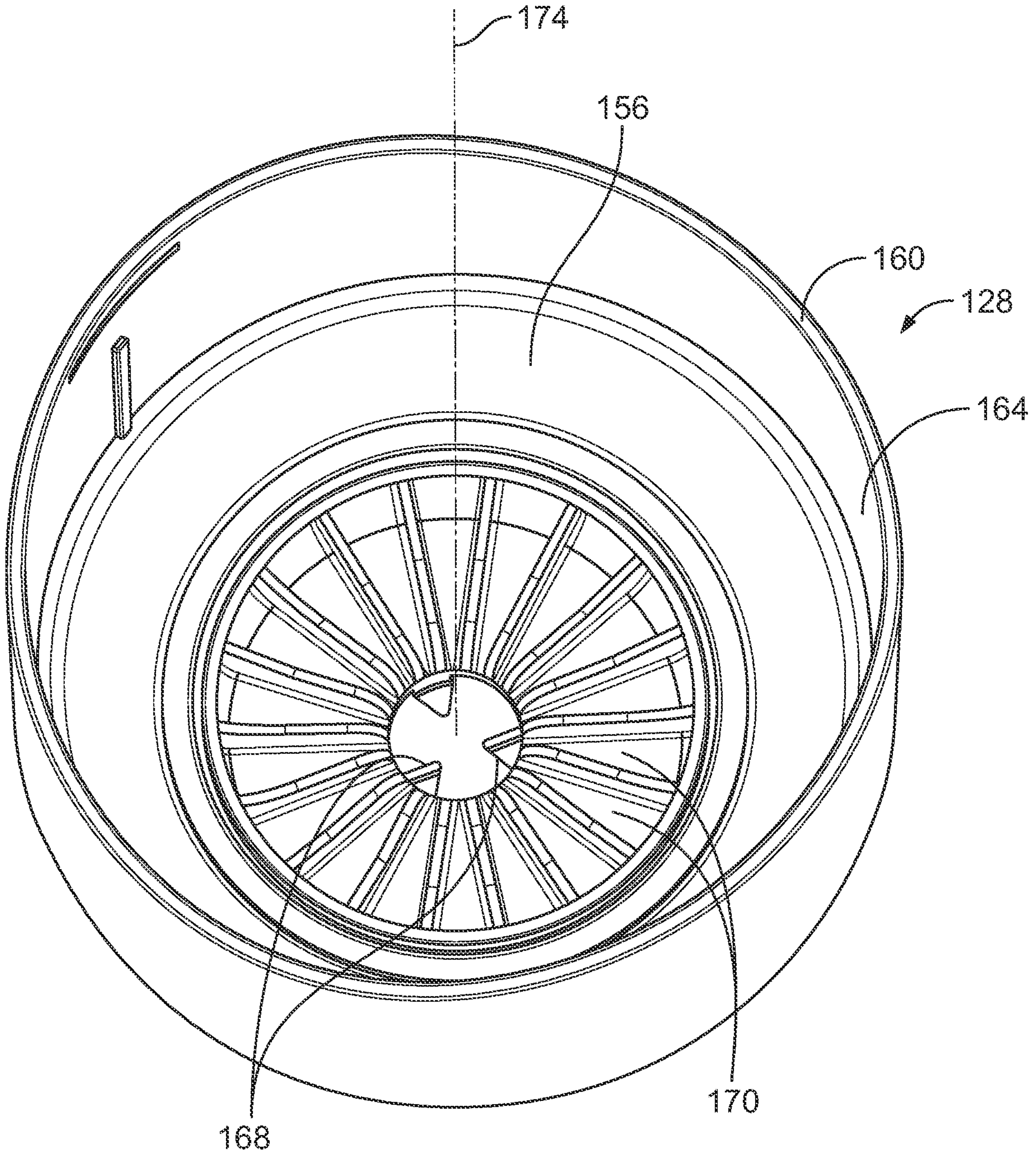
FIG. 9 is a top perspective view of FIG. 7.
Figure 10:
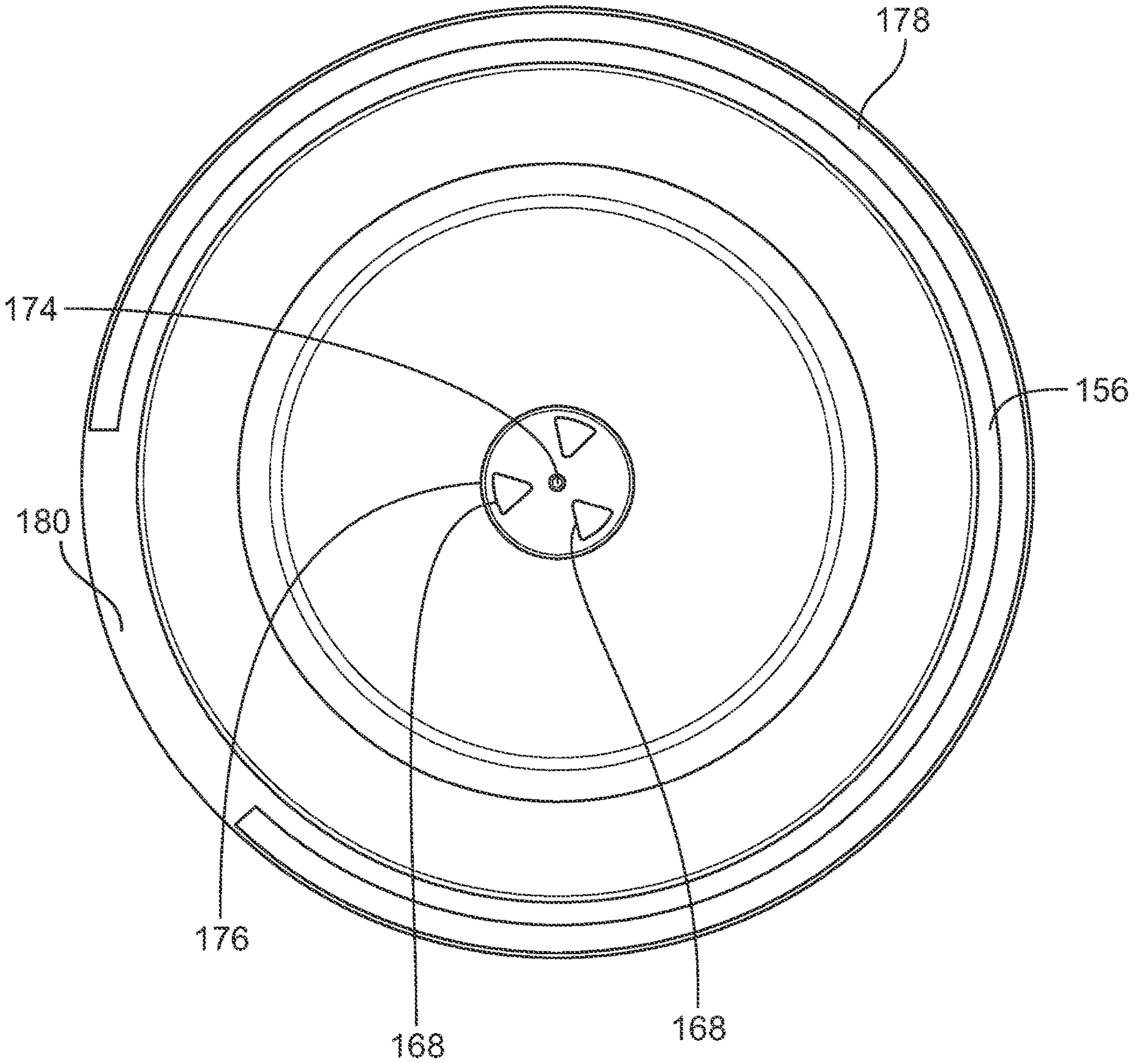
FIG. 10 is a bottom view of FIG. 7.

As best illustrated in FIGS. 7, 9, and 10, the lower portion 128 also includes one or more body outlets 168 and a plurality of flow surfaces 172. In this example, the lower portion 128 includes three body outlets 168 formed in and extending through the base 156 and a neck 176 coupled to the base 156, with each outlet 168 having a triangular shape. The three body outlets 168 are preferably symmetrically arranged about a central axis 174 of the assembly 100. In other examples, however, the lower portion 128 can include more or less body outlets 168 and/or each outlet 168 can have a different shape (e.g., a circular shape). Meanwhile, the plurality of flow surfaces 172 protrude outward (upward in the orientation illustrated in FIG. 9) from the base 156 and extend radially outward from the body outlets 168 and toward the inner wall 164. In this example, the plurality of flow surfaces 172 are a plurality of fins disposed symmetrically around the outlets 168 (and the central axis 174). In other examples, however, the plurality of flow surfaces 172 can be a plurality of columns, a plurality of dots, a plurality of cubes, a plurality of pyramids, one or more other suitably shaped objects, and/or combinations thereof. In any event, the plurality of flow surfaces 172 are arranged to interact with the beverage that enters through the body inlet 140 and flows through the plurality of body apertures 152. At the same time, the plurality of flow surfaces 172 direct the beverage towards and into the one or more body outlets 168, which in turn permit the beverage poured into the body portion 104 to access the other components of the assembly 100.

The lower portion 128 further includes a rim 178 and a first track 180 formed in the rim 178. As best illustrated in FIG. 7, the rim 178 extends outward (downward in the orientation illustrated in FIG. 7) from a bottom surface of the outer wall 160. In this example, the rim 178 partially surrounds the base 156. As also best illustrated in FIG. 7, the first track 180 is defined between a first end 182A of the rim 178 and a second end 1828 of the rim 178. As will be discussed in greater detail below, the first track 180 is thus arranged to receive a portion of the diverter member 108 as the diverter member 108 moves between the different positions discussed herein.

As best illustrated in FIG. 4, when the upper portion 124 is slidably disposed in the lower portion 128, thereby coupling the upper portion 124 to the lower portion 128, an interior void volume 184 is formed between the upper portion 124 and the lower portion 128. More particularly, the interior void volume 184 is formed between the upper base 136, the sealing element 154, and the plurality of flow surfaces 172. The interior void volume 184 is thus sized and shaped to receive and retain the filter 132 therein. In turn, the filter 132, which in this example takes the form of a disposable pod, is in fluid communication with the plurality of body apertures 152, the body outlets 168, and the plurality of flow surfaces 172. As such, the filter 132 is configured to remove impurities from the beverage after the beverage flows through the inlet 140 and through the plurality of body apertures 152. Moreover, and beneficially, the filter 132 is retained in the interior void volume 184 in a substantially flat orientation. Retaining the filter 132 in a substantially flat orientation allows the beverage to interact with the greatest amount of filter media in the filter 132 as the beverage passes through the filter 132.

Reference will now be made to FIGS. 11-14 to discuss further details about the diverter member 108. As discussed above, the diverter member 108 is movable (and, more particularly, rotatable) relative to the body portion 104 and the aerator member 112 between several different positions and, depending on the position of the diverter member 108, directs the beverage passing through the assembly 100 to different portions of the diverter member 108 and different portions of the aerator member 112. Thus, as also briefly discussed above, the diverter member 108 can be positioned so as to fully aerate the beverage passing through the diverter member 108 and the aerator member 112, can be positioned so as to partially aerate the beverage passing through the diverter member 108 and the aerator member 112, or can be positioned so as to have the beverage pass through the diverter member 108 and the aerator member 112 without being aerated.

As best illustrated in FIGS. 11-14, the diverter member 108 in this example includes a diverter base 200, a cylindrical wall 204 that extends outwardly (upwardly in the orientation shown in FIG. 11) from the diverter base 200, a spout 208 that extends outwardly (downwardly in the orientation shown in FIG. 11) from the diverter base 200, and a positioning member 212 that allows the user of the assembly 100 to change the position of the diverter member 108. The diverter member 108 also includes a lip 216 that extends outwardly from the cylindrical wall 204. In this example, the lip 216 extends perpendicularly from the cylindrical wall 204, such that the lip 216 forms a ledge that extends radially outward from the cylindrical wall 204. In other examples, however, the lip 216 can extend outwardly from the cylindrical wall 204 at a non-perpendicular angle. In any event, the ledge is arranged to be disposed immediately proximate, if not in engagement with, the rim 178 of the body portion 104 when the diverter member 108 is coupled to the body portion 104. In turn, the positioning member 212, which in this example takes the form of a tab carried by the ledge, is movably disposed within the first track 180.

Figure 11:
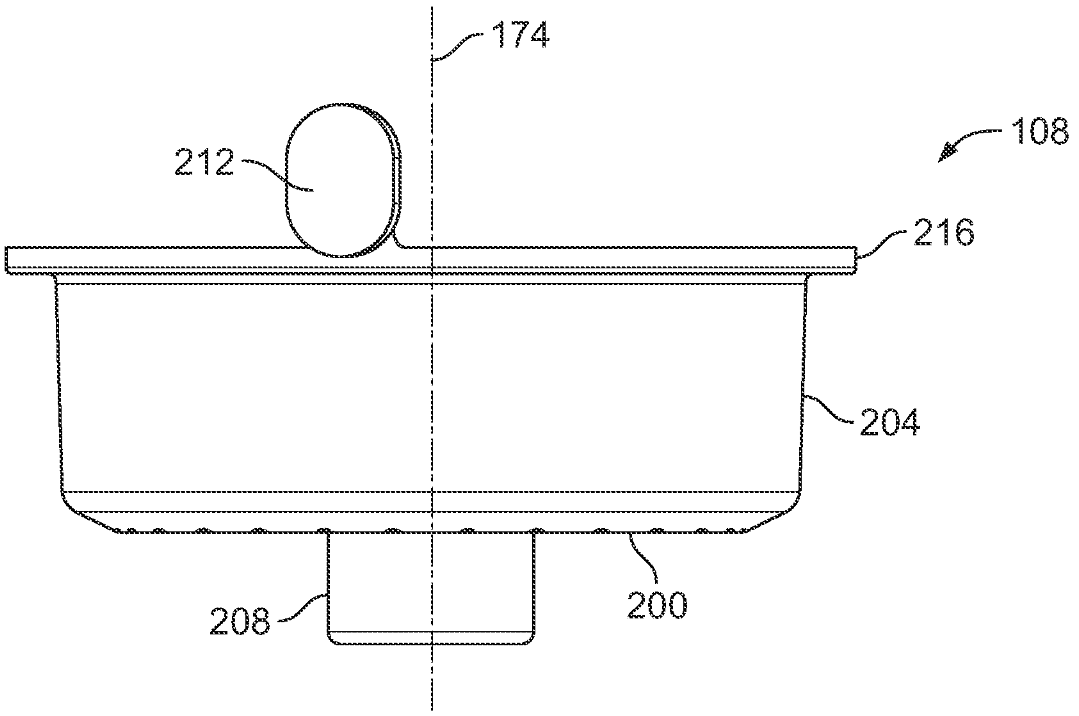
FIG. 11 is a plan view of a diverter member of the assembly of FIG. 1.
Figure 12:
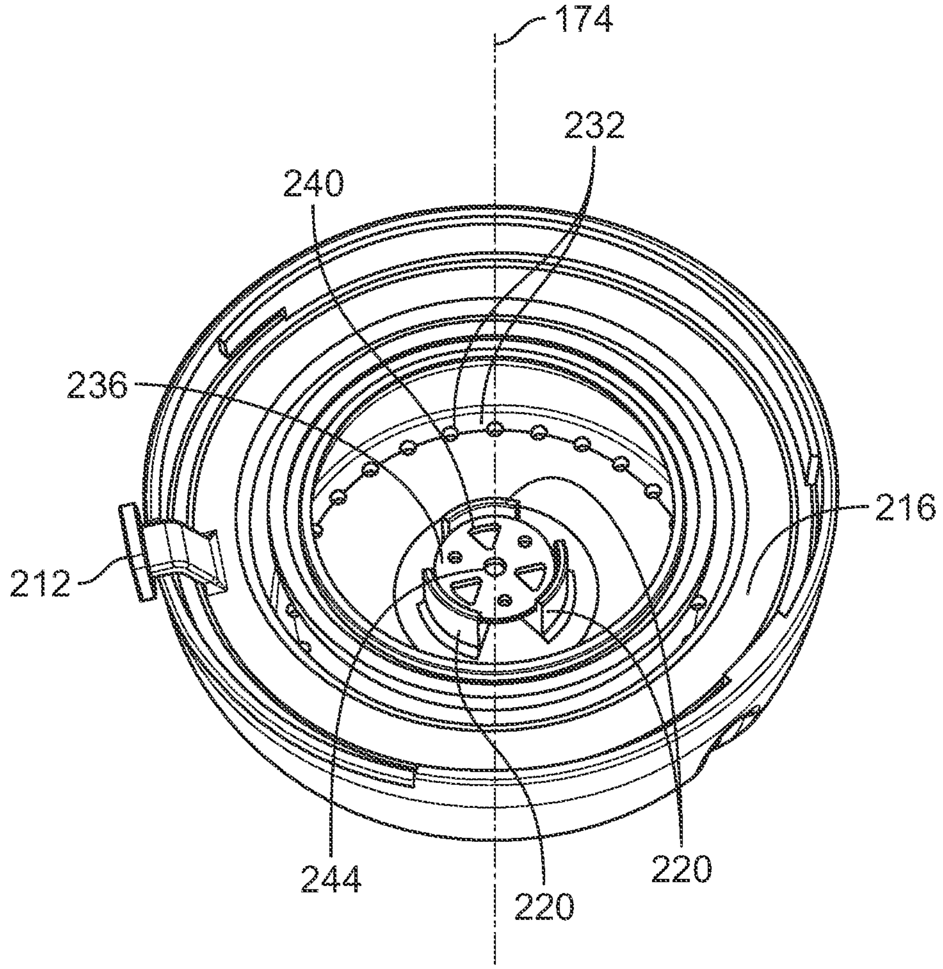
FIG. 12 is a top perspective view of the diverter member of FIG. 11 and an aerator member of the assembly of FIG. 1.

The spout 208 is generally configured to direct the beverage to the appropriate portion(s) of the aerator member 112 based on the position of the diverter member 108. As best illustrated in FIGS. 11 and 12, the spout 208 generally has a first portion that extends outwardly from the diverter base 200 in a first direction (upward in the orientation shown in FIGS. 11 and 12) and a second portion that extends outwardly from the diverter base 200 in a second direction (downward in the orientation shown in FIGS. 11 and 12). In this example, the first portion of the spout 208 is defined by three partially cylindrical walls 220 that are circumferentially arranged and evenly spaced from another about the central axis 174. In other examples, however, the first portion of the spout 208 can be defined differently (e.g., can be defined by a single wall 220). Meanwhile, in this example, the second portion of the spout 208 is defined by a single cylindrical wall 224 that has a uniform diameter and is longer than each of the three walls 220. The diameter of the cylindrical wall 224 can be the same as or different than the diameter of the cylindrical walls 220.

Figure 13:
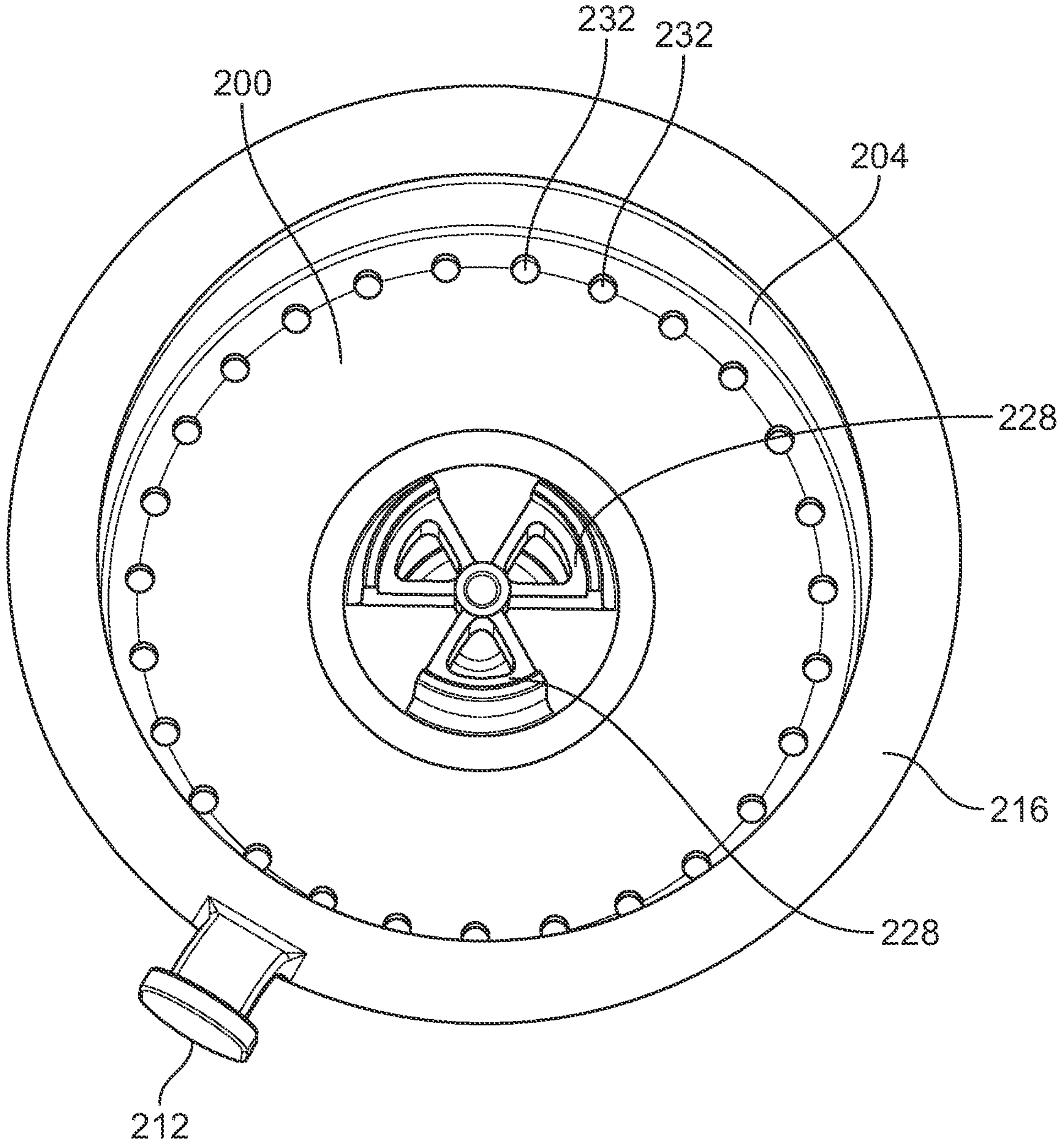
FIG. 13 is a top view of the diverter member of FIG. 11.
Figure 14:
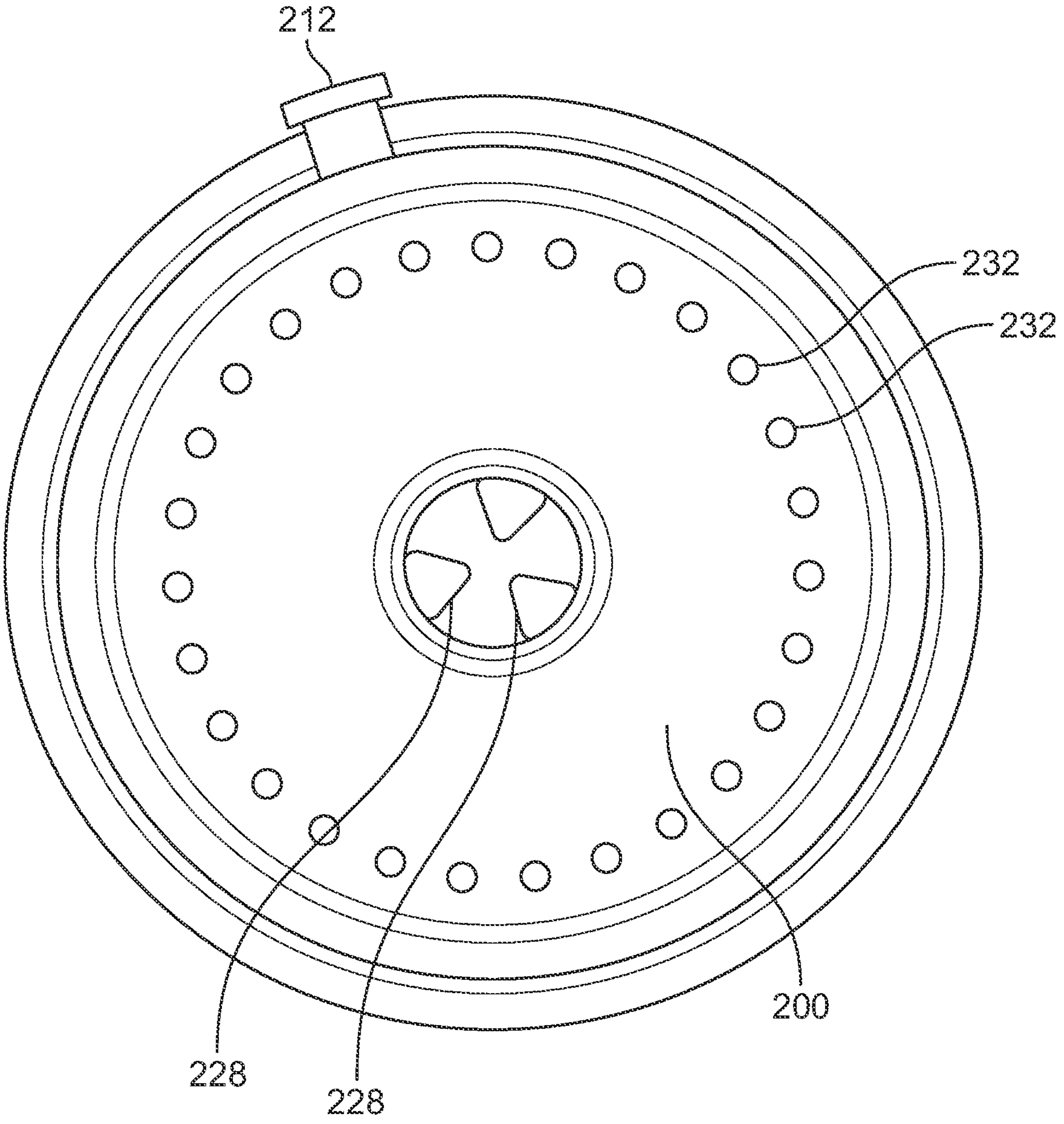
FIG. 14 is a top view of the diverter member of FIG. 11 and the aerator member of FIG. 12.

As best illustrated in FIGS. 12-14, the diverter member 108 also includes one or more primary apertures 228, one or more secondary apertures 232, and a diverter disk 236 coupled to the spout 208. The one or more primary apertures 228 are in selective fluid communication with the reservoir 106 of the body portion 104 (i.e., the apertures 228 are or are not in fluid communication with the reservoir 106 depending upon the position of the diverter member 108). The one or more primary apertures 228 are generally defined by the diverter base 200 and the first portion of the spout 208. In this example, the diverter member 108 includes three primary apertures 228 that correspond to the three body outlets 168 of the body portion 104. Thus, like the three body outlets 168, the three primary apertures 228 are symmetrically arranged about the central axis 174, and each primary aperture 228 has a triangular shape identical to the triangular shape of the body outlets 168. In other examples, however, the diverter member 108 can include more or less primary apertures 228 and/or the primary apertures 228 can have a different shape, size, or be defined differently.

The one or more secondary apertures 232 are also in selective fluid communication with the reservoir 106 of the body portion 104 (i.e., the apertures 232 are or are not in fluid communication with the reservoir 106 depending upon the position of the diverter member 108). The one or more secondary apertures 232 are generally formed through the diverter base 200 at a position proximate the cylindrical wall 204 and radially outward of the one or more primary apertures 228. In this example, the diverter member 108 includes twenty-six secondary apertures 232 circumferentially arranged in the diverter base 200 about the central axis 174, such that the secondary apertures 232 surround the primary apertures 228 within the diverter member 108. It will be appreciated that each of the secondary apertures 232 has a circular shape and has a diameter that is smaller than a diameter of the primary apertures 228. In other examples, however, the diverter member 108 can include more or fewer secondary apertures 232 and/or the secondary apertures 232 can have different shapes, sizes, or be defined differently.

Meanwhile, the diverter disk 236 cooperates with the spout 208 to direct the beverage to the appropriate portion(s) of the aerator member 112 based on the position of the diverter member 108. To this end, the diverter disk 236 has a shape and size that generally corresponds to the shape and size of the first portion of the spout 208 and the primary apertures 228. Thus, in this example, the diverter disk 236 also includes three disk apertures 240 each having a triangular shape identical to the triangular shape of the body outlets 168 and the primary apertures 228. As best illustrated in FIG. 12, the diverter disk 236 is thus configured to be disposed in, and retained by, the first portion of the spout 208. More particularly, the diverter disk 236 is disposed between and retained by the cylindrical walls 220 of the spout 208. When the diverter disk 236 is so disposed, the disk apertures 240 are circumferentially arranged about the central axis 174. The disk apertures 240 are fully, partially, or not aligned with the primary apertures 228, depending upon the position of the diverter member 108. The diverter disk 236 also includes a recess 244 that is arranged to receive and engage a detent 248 carried on the neck 176, thereby securing the diverter disk 236 to the body portion 104. This engagement also helps to couple the body portion 104 and the diverter member 108 together while at the same time allowing the diverter member 108 to be rotatable between the various positions discussed above.

Figure 15:
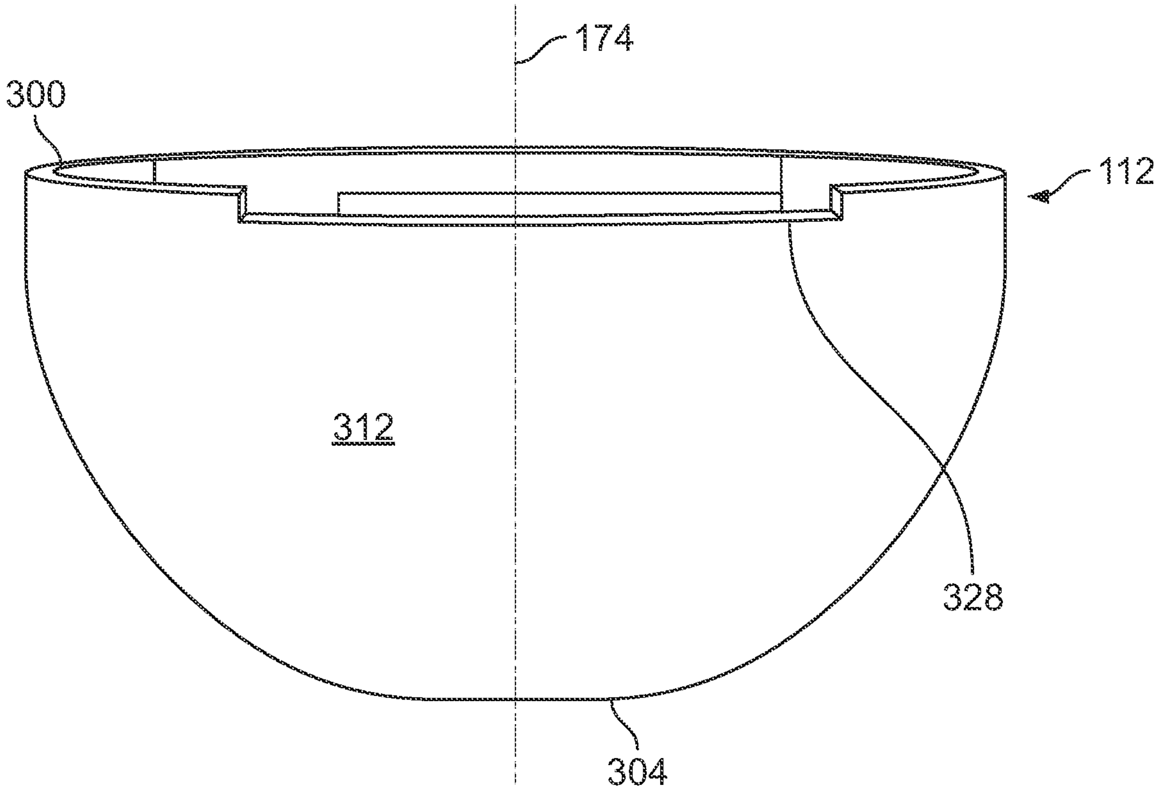
FIG. 15 is a front perspective view of the diverter member and the aerator member.
Figure 16:
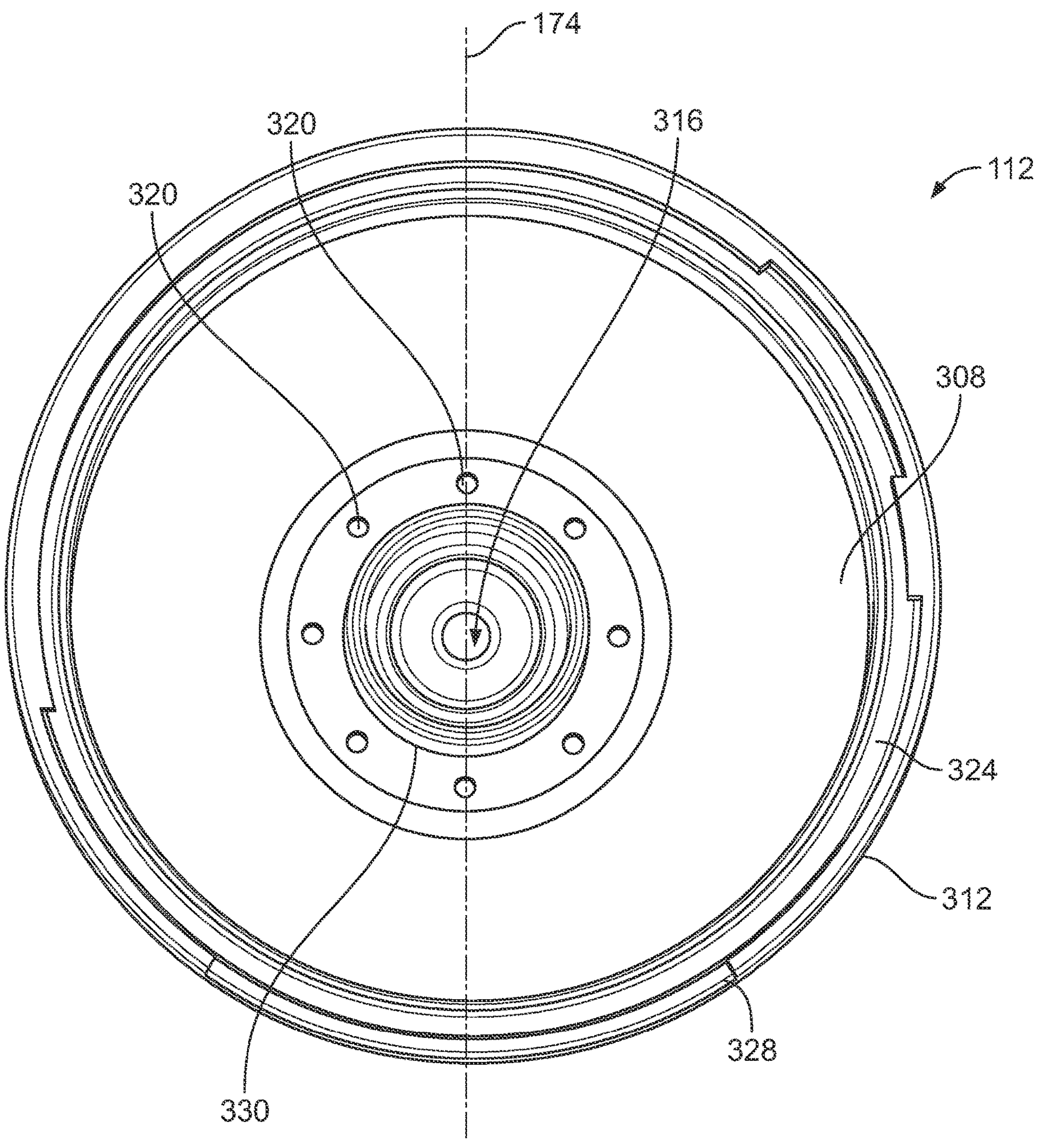
FIG. 16 is a top view of the aerator member.
Figure 17:
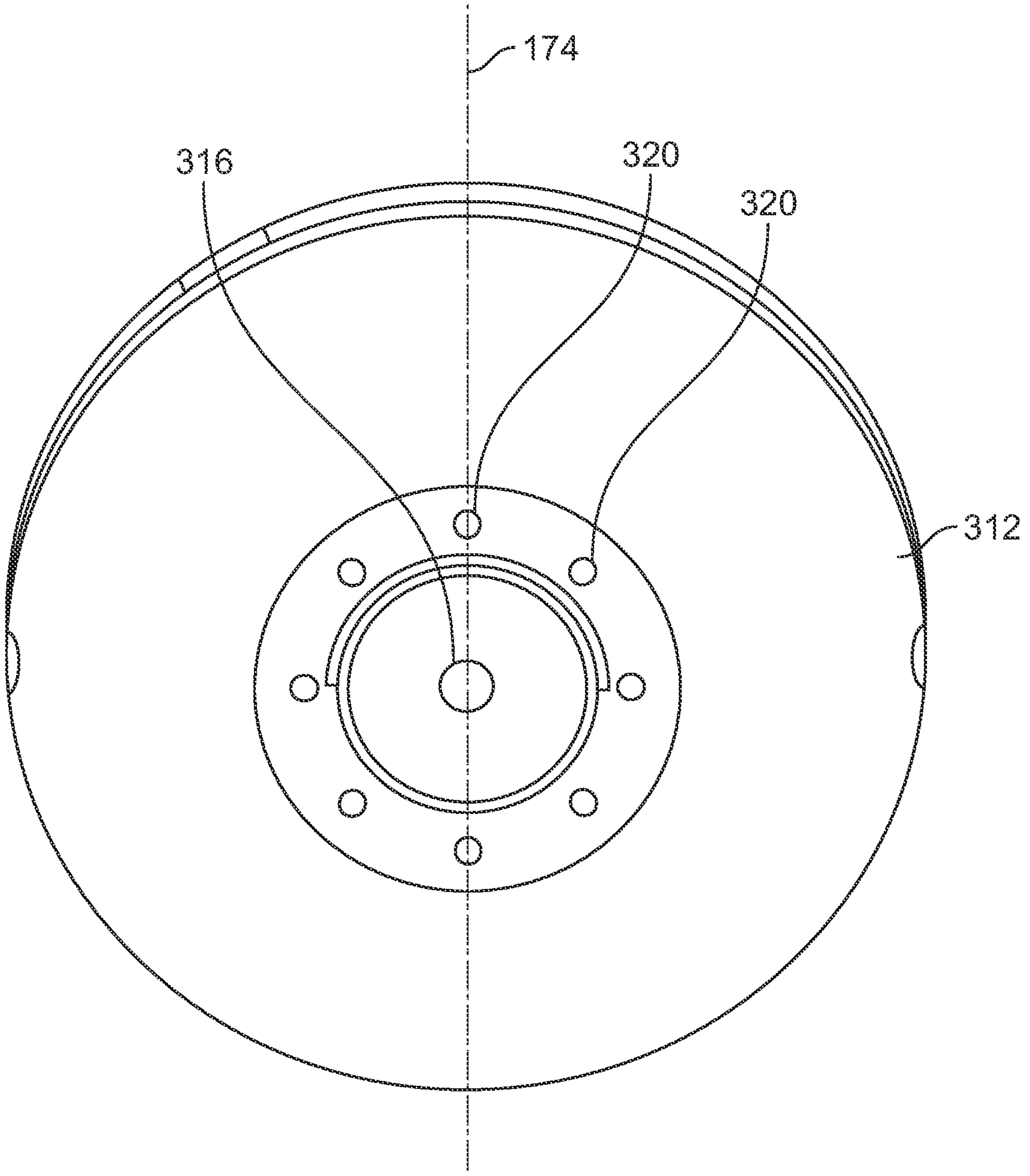
FIG. 17 is a bottom view of FIG. 16.

Reference will now be made to FIGS. 15-17 to discuss further details about the aerator member 112. The aerator member 112 in this example has a generally parabolic cross-sectional shape defined by a first end 300, a second end 304 opposite the first end 300, an inner surface 308, an outer surface 312, a central outlet 316 disposed at the second end 304, and one or more aerator outlets 320 also disposed at the second end 304.

In this example, the first end 300 is removably coupled to the body portion 104 (particularly the rim 178 of the body portion 104) using one or more snap fit features that engage snap fit features provided on the rim 178. When the snap fit features of the first end 300 engage the snap fit features on the rim 178, the first end 300 is non-rotatably secured to the body portion 104. However, at the same time, the aerator member 112 (or the body portion 104) can be rotated to disengage the one or more snap fit features of the first end 300 from the one or more snap fit features of the rim 178 in order to decouple the aerator member 112 from the body portion 104 (and vice-versa). In other examples, however, the first end 300 can be removably coupled to the body portion 104 in a different manner (e.g., using a different mechanical fastening arrangement).

In this example, both the inner surface 308 and the outer surface 312 are substantially smooth. In other examples, however, the inner surface 308 can include one or more flow features (e.g., a plurality of ribs) disposed thereon to facilitate aeration. As best illustrated in FIG. 17, the central outlet 316 has a circular shape and is co-axial with the central axis 174 when the aerator member 112 is coupled to the body portion 104. Meanwhile, the one or more aerator outlets 320 are generally disposed radially outward of the central outlet 316. In this example, the aerator member 112 includes eight aerator outlets 320 circumferentially arranged about the central outlet 316, such that the aerator outlets 320 surround the central outlet 316 (and, in turn, the central axis 174). As also best illustrated in FIG. 17, each of the aerator outlets 320 has a circular shape and has a diameter that is smaller than a diameter of the central outlet 316. In other examples, however, the aerator member 112 can include more or less aerator outlets 320, the aerator outlets 320 can have a different shape or size, or the aerator outlets 320 can be arranged in a different manner.

It will be appreciated that the central outlet 316 is in fluid communication with the primary apertures 228 and, as such, is in fluid communication with the reservoir 106 of the body portion 104 when the primary apertures 228 are in fluid communication with the reservoir 106 of the body portion 104. When this happens, the central outlet 316 provides a fluid pathway for the beverage to pass from the diverter member 108 (particularly the spout 208) and out of the aerator member 112 (and the assembly 100 more generally) without being aerated. On the other hand, it will be appreciated that the one or more aerator outlets 320 are in fluid communication with the secondary apertures 232 and, as such, are in fluid communication with the reservoir 106 of the body portion 104 when the secondary apertures 232 are in fluid communication with the reservoir 106 of the body portion 104. When this happens, the aerator outlets 320 provide a fluid pathway for the beverage to pass from the diverter member 108 (via the secondary apertures 232), along the inner surface 308, and out of the aerator member 112 (and the assembly 100 more generally). However, the aerator outlets 320 cause the beverage to pass therethrough as droplets or narrow streams, such that the beverage is aerated.

The aerator member 112 in this example also includes an aerator lip 324, a second track 328, and a projection 330. The aerator lip 324 extends inwardly from the inner surface 308 at a position immediately proximate the first end 300. In this example, the aerator lip 324 extends perpendicularly from the inner surface 308, such that the aerator lip 324 forms a ledge that extends radially inward from the inner surface 308. In other examples, however, the aerator lip 324 can extend inwardly from the inner surface 308 at a non-perpendicular angle. In any event, the ledge formed by the lip 324 is arranged to receive the ledge formed by the lip 216 of the diverter member 108 in order to help couple the diverter member 108 and the aerator member 112 together. Meanwhile, the second track 328 is disposed at the first end 300. In turn, the second track 328 is, like the first track 180, arranged to receive a portion of the diverter member 108 as the diverter member 108 moves between the different positions discussed herein. Finally, the projection 330 extends axially outward (upward in the orientation shown in FIG. 15) from the second end 304, but at a position within the aeration member 300. In this example, the projection 330 is disposed between the central outlet 316 and the aerator outlets 320, such that the projection 330 isolates the central outlet 316 from the aerator outlets 320. Additionally, the projection 330 is arranged to receive the second portion of the spout 208 when the diverter member 108 and the aerator member 112 are coupled together.

As briefly discussed above, the diverter member 108 is movable relative to the body portion 104 and the aerator member 112 between different positions, depending on whether or not the user would like to aerate the beverage passing through the assembly and, if the user would like to aerate the beverage, the degree of aeration that the user would like to be provided by the aerator member 112. In particular, the diverter member 108 is movable between the first position, the second position, and various third positions intermediate the first position and the second position by moving the positioning member 212 within the first track 180 and the second track 328.

When the positioning member 212 is disposed within the first track 180 and the second track 328 such that the positioning member 212 is seated against the first end 182A of the rim 178 of the body portion 104, as illustrated in FIG. 1, the diverter member 116 is in the first position. When the diverter member 116 is so positioned, the one or more primary apertures 228 of the diverter member 116 are aligned with the body outlets 168 and the disk apertures 240, such that the one or more primary apertures 228 are in fluid communication with the reservoir 106 of the body portion 104. In turn, because the central outlet 316 is in fluid communication with the primary apertures 228, the central outlet 316 is in fluid communication with the reservoir 106 of the body portion 104. Accordingly, when the diverter member 116 is in the first position, the beverage poured into the body inlet 148 will pass through the body inlet 148, through the body apertures 152, through the filter 132, along the plurality of flow surfaces 172, through the body outlets 168 (and out of the body portion 104), through the disk apertures 240, through the primary apertures 228, through the spout 208 (and out of the diverter member 108), through the projection 330, and through and out of the central outlet 316. In any event, so configured, the beverage passes through the assembly 100 without being aerated when the diverter member 108 is in the first position.

While not illustrated herein, it will be appreciated that when the positioning member 212 is disposed within the first track 180 and the second track 328 such that the positioning member 212 is seated against the second end 1828 of the rim 178 of the body portion 104, the diverter member 116 is in the second position. The movement of the diverter member 116 from the first position to the second position rotates the one or more primary apertures 228 out of alignment with the body outlets 168 and the disk apertures 240. This severs the fluid communication between the one or more primary apertures 228 and the reservoir 106 of the body portion 104 but simultaneously places the body outlets 168 and the disk apertures 240 in fluid communication with the secondary apertures 232, thereby placing the secondary apertures 232 in fluid communication with the reservoir 106 of the body portion 104. In turn, because the one or more aerator outlets 320 are in fluid communication with the secondary apertures 232, the one or more aerator outlets 320 are in fluid communication with the reservoir 106 of the body portion 104. Accordingly, when the diverter member 108 is in the second position, the beverage poured into the body inlet 148 will pass through the body inlet 148, through the body apertures 152, through the filter 132, along the plurality of flow surfaces 172, through the body outlets 168 (and out of the body portion 104), through the disk apertures 240, through the secondary apertures 232, along the inner surface 308 of the aerator member 112, and through and out of the aerator outlets 320. In any event, so configured, the beverage passes through the assembly 100 without being aerated when the diverter member 108 is in the first position. In any event, so configured, when the diverter member 108 is in the second position, the beverage is aerated as it passes through the assembly 100.

Further, while also not illustrated herein, it will be appreciated that when the positioning member 212 is disposed within the first track 180 and the second track 328 such that the positioning member 212 is somewhere between the first and second ends 182A, 1828 of the rim 178 of the body portion 104, the diverter member 116 is in one of the intermediate third positions. The movement of the diverter member 116 from the first position or the second position to the third position rotates the one or more primary apertures 228 into partial alignment with the body outlets 168 and the disk apertures 240, with the degree of alignment dependent upon how close the third position is to the first position. In any event, this partial alignment simultaneously places the reservoir 106 of the body portion 104 in fluid communication with both the one or more primary apertures 228 and the one or more secondary apertures 232. In turn, the central outlet 316 and the one or more aerator outlets 320 are simultaneously in fluid communication with the reservoir 106 of the body portion 104. Accordingly, when the diverter member 116 is in the third position, the beverage poured into the body inlet 148 will pass through the body inlet 148, through the body apertures 152, through the filter 132, along the plurality of flow surfaces 172, through the body outlets 168 (and out of the body portion 104), and through the disk apertures 240. At this point, a first portion of the beverage will pass through the primary apertures 228, through the spout 208 (and out of the diverter member 108), through the projection 330, and through and out of the central outlet 316, such that the first portion of the beverage passes through the assembly 100 without being aerated. At the same time, a second portion of the beverage will pass through the secondary apertures 232, along the inner surface 308 of the aerator member 112, and through and out of the aerator outlets 320, such that the second portion of the beverage is aerated while passing through the assembly 100.

It will be appreciated that the ratio of the first portion of the beverage to the second portion of the beverage will of course depend on the exact positioning of the positioning member 212 relative to the first position. Generally speaking, the closer the positioning member 212 is to the first position, the greater the first portion of the beverage, that ratio, and the amount of the beverage that is not aerated will be. In other words, the closer the third position of the diverter member 108 is to the first position, the greater the amount of the beverage that will pass through the assembly 100 without being aerated.

The invention claimed is:

1. An assembly for selectively aerating a beverage, the assembly comprising:

a body portion defining a reservoir adapted to receive the beverage;

a diverter in fluid communication with and operably coupled to the body portion, the diverter being movable between a first position, a second position, and a third position intermediate the first position and the second position; and an aerator in fluid communication with the diverter, the aerator including a central outlet and one or more aeration outlets, wherein when the diverter is in the first position, the diverter is aligned with the body portion such that the beverage flows through the reservoir of the body portion and the central outlet while bypassing the one or more aeration outlets, wherein when the diverter is in the second position, the diverter is aligned with the body portion such that the beverage flows through the reservoir of the body portion and the one or more aeration outlets while bypassing the central outlet, and wherein when the diverter is in the third position, the diverter is aligned with the body portion such that the beverage flows through the reservoir of the body portion, a first portion of the beverage flows through the central outlet while bypassing the one or more aeration outlets, and a second portion of the beverage flows through the one or more aeration outlets while bypassing the central outlet.

2. The assembly of claim 1, wherein the one or more aeration outlets comprise a plurality of aeration outlets circumferentially arranged around the central outlet.

3. The assembly of claim 1, further comprising a positioning member carried by the diverter and configured to move the diverter between the first position, the second position, and the third position.

4. The assembly of claim 3, wherein the positioning member is at least partially disposed in a track formed in the aerator, the positioning member movably disposed in the track to move the diverter between the first position, the second position, and the third position.

5. The assembly of claim 1, wherein the diverter comprises:

one or more primary apertures in fluid communication with the central outlet and in selective fluid communication with the reservoir of the body portion; and one or more secondary apertures in fluid communication with the one or more aeration outlets and in selective fluid communication with the reservoir of the body portion.

6. The assembly of claim 5, wherein the one or more secondary apertures are disposed radially outward of the one or more primary apertures.

7. The assembly of claim 6, wherein the one or more secondary apertures are circumferentially arranged around the one or more primary apertures.

8. The assembly of claim 5, wherein:

wherein when the diverter is in the first position, the one or more primary apertures are in fluid communication with the reservoir of the body portion such that the beverage flows through the reservoir, the one or more primary apertures, and the central outlet while bypassing the one or more aeration outlets, wherein when the diverter is in the second position, the one or more secondary apertures are in fluid communication with the reservoir of the body portion such that the beverage flows through the reservoir, the one or more secondary apertures, and the one or more aeration outlets while bypassing the central outlet, and wherein when the diverter is in the third position, the one or more primary apertures and the one or more secondary apertures are both in fluid communication with the reservoir of the body portion such that the first portion of the beverage flows through the reservoir, the one or more primary apertures, and the central outlet while bypassing the one or more aeration outlets, and the second portion of the beverage flows through the reservoir, the one or more secondary apertures, and one or more aeration outlets while bypassing the central outlet.

9. The assembly of claim 1, further comprising a disposable filter configured to remove impurities from the beverage as the beverage flows therethrough.

10. An assembly for selectively aerating a beverage, the assembly comprising:

a body portion defining a reservoir adapted to receive the beverage;

a diverter in fluid communication with and operably coupled to the body portion, the diverter being movable between a first position, a second position, and a third position intermediate the first position and the second position; and an aerator in fluid communication with the diverter, the aerator including a central outlet and one or more aeration outlets, wherein the diverter comprises:

one or more primary apertures in fluid communication with the central outlet and in selective fluid communication with the reservoir of the body portion; and one or more secondary apertures in fluid communication with the one or more aeration outlets and in selective fluid communication with the reservoir of the body portion, wherein when the diverter is in the first position, the one or more primary apertures are in fluid communication with the reservoir of the body portion such that the beverage flows through the reservoir, the one or more primary apertures, and the central outlet while bypassing the one or more aeration outlets, wherein when the diverter is in the second position, the one or more secondary apertures are in fluid communication with the reservoir of the body portion such that the beverage flows through the reservoir, the one or more secondary apertures, and the one or more aeration outlets while bypassing the central outlet, and wherein when the diverter is in the third position, the one or more primary apertures and the one or more secondary apertures are both in fluid communication with the reservoir of the body portion such that a first portion of the beverage flows through the reservoir, the one or more primary apertures, and the central outlet while bypassing the one or more aeration outlets, and a second portion of the beverage flows through the reservoir, the one or more secondary apertures, and one or more aeration outlets while bypassing the central outlet.

11. The assembly of claim 10, wherein the one or more aeration outlets comprise a plurality of aeration outlets circumferentially arranged around the central outlet.

12. The assembly of claim 10, further comprising a positioning member carried by the diverter and configured to move the diverter between the first position, the second position, and the third position.

13. The assembly of claim 12, wherein the positioning member is at least partially disposed in a track formed in the aerator, the positioning member movably disposed in the track to move the diverter between the first position, the second position, and the third position.

14. The assembly of claim 10, wherein the one or more secondary apertures are disposed radially outward of the one or more primary apertures.

15. The assembly of claim 14, wherein the one or more secondary apertures are circumferentially arranged around the one or more primary apertures.

16. The assembly of claim 10, further comprising a disposable filter configured to remove impurities from the beverage as the beverage flows therethrough.

17. An assembly for selectively aerating a beverage, the assembly comprising:

a body portion defining a reservoir adapted to receive the beverage, the body portion comprising a first body portion and a second body portion removably coupled to the first body portion;

a disposable filter disposed between the first body portion and the second body portion, the disposable filter configured to remove impurities from the beverage as the beverage flows therethrough;

a diverter in fluid communication with and operably coupled to the body portion, the diverter being movable between a first position, a second position, and a third position intermediate the first position and the second position; and an aerator in fluid communication with the diverter, the aerator including a central outlet and one or more aeration outlets, wherein when the diverter is in the first position, the diverter is aligned with the body portion such that the beverage flows through the reservoir of the body portion and the central outlet while bypassing the one or more aeration outlets, wherein when the diverter is in the second position, the diverter is aligned with the body portion such that the beverage flows through the reservoir of the body portion and the one or more aeration outlets while bypassing the central outlet, and wherein when the diverter is in the third position, the diverter is aligned with the body portion such that the beverage flows through the reservoir of the body portion, a first portion of the beverage flows through the central outlet while bypassing the one or more aeration outlets, and a second portion of the beverage flows through the one or more aeration outlets while bypassing the central outlet.

18. The assembly of claim 17, wherein the one or more aeration outlets comprise a plurality of aeration outlets circumferentially arranged around the central outlet.

19. The assembly of claim 17, further comprising a positioning member carried by the diverter and configured to move the diverter between the first position, the second position, and the third position.

20. The assembly of claim 19, wherein the positioning member is at least partially disposed in a track formed in the aerator, the positioning member movably disposed in the track to move the diverter between the first position, the second position, and the third position.

21. The assembly of claim 17, wherein the diverter comprises:

one or more primary apertures in fluid communication with the central outlet and in selective fluid communication with the reservoir of the body portion; and one or more secondary apertures in fluid communication with the one or more aeration outlets and in selective fluid communication with the reservoir of the body portion.

22. The assembly of claim 21, wherein:

wherein when the diverter is in the first position, the one or more primary apertures are in fluid communication with the reservoir of the body portion such that the beverage flows through the reservoir, the one or more primary apertures, and the central outlet while bypassing the one or more aeration outlets, wherein when the diverter is in the second position, the one or more secondary apertures are in fluid communication with the reservoir of the body portion such that the beverage flows through the reservoir, the one or more secondary apertures, and the one or more aeration outlets while bypassing the central outlet, and wherein when the diverter is in the third position, the one or more primary apertures and the one or more secondary apertures are both in fluid communication with the reservoir of the body portion such that the first portion of the beverage flows through the reservoir, the one or more primary apertures, and the central outlet while bypassing the one or more aeration outlets, and the second portion of the beverage flows through the reservoir, the one or more secondary apertures, and one or more aeration outlets while bypassing the central outlet.

23. A method of aerating a beverage, the method comprising:

providing the assembly of claim 1;

providing the beverage to the assembly; and moving the diverter to the second position or the third position.

24. A method of filtering a beverage, the method comprising:

providing the assembly of claim 1;

placing a filter within the body portion; and providing the beverage to the assembly.

* * * * *